US009553452B2

(12) United States Patent
 Gillett

(10) Patent No.: US 9,553,452 B2
(45) Date of Patent: Jan. 24, 2017

(54) HYBRID ENERGY SYSTEM

(75) Inventor: Carla R. Gillett, Sacramento, CA (US)

(73) Assignee: Carla R. Gillett, Sacramento ( * ) Notice: Subject to any disclaimer, the term of this patent is extended or adjusted under 35 U.S.C. 154(b) by 636 days.

(21) Appl. No.: 13/135,416

(22) Filed: Jul. 6, 2011

(65) Prior Publication Data
 US 2013/0009469 A1 Jan. 10, 2013

(51) Int. Cl.
 *H02J 3/38* (2006.01)
 *H02J 3/30* (2006.01)

(52) U.S. Cl.
 CPC .............. *H02J 3/30* (2013.01); *H02J 3/382* (2013.01); *H02J 3/383* (2013.01); *H02J 3/386* (2013.01); *Y02E 10/563* (2013.01); *Y02E 10/566* (2013.01); *Y02E 10/763* (2013.01); *Y02E 60/16* (2013.01); *Y02E 70/30* (2013.01); *Y02P 80/11* (2015.11); *Y10T 307/359* (2015.04)

(58) Field of Classification Search
 CPC .............. H02J 3/30; H02J 3/382; H02J 3/383; H02J 3/386
 See application file for complete search history.

(56) References Cited

U.S. PATENT DOCUMENTS

| 2,531,230 | A | * | 11/1950 | Mason | 290/1 R |
| 4,025,860 | A | * | 5/1977 | Shibata et al. | 320/126 |
| 5,037,268 | A | * | 8/1991 | Fenlon | F03D 3/002 |
| | | | | | 415/2.1 |
| 8,790,068 | B2 | * | 7/2014 | Cantwell | F03D 3/02 |
| | | | | | 290/55 |
| 2002/0175657 | A1 | * | 11/2002 | Leboe | 320/132 |
| 2005/0015182 | A1 | * | 1/2005 | Bebic et al. | 700/286 |
| 2008/0179887 | A1 | * | 7/2008 | Kawazoe et al. | 290/44 |
| 2008/0179891 | A1 | * | 7/2008 | Lane | 290/40 C |
| 2010/0017045 | A1 | * | 1/2010 | Nesler et al. | 700/296 |
| 2011/0073392 | A1 | * | 3/2011 | Collins et al. | 180/65.22 |
| 2012/0051902 | A1 | * | 3/2012 | Ali | F03B 3/00 |
| | | | | | 415/208.2 |
| 2012/0293138 | A1 | * | 11/2012 | Kanzaki et al. | 320/166 |
| 2014/0015314 | A1 | * | 1/2014 | Shiba | 307/9.1 |

* cited by examiner

*Primary Examiner* — Carlos Amaya
*Assistant Examiner* — Joel Barnett

(57) ABSTRACT

The Hybrid Energy System is a business network with utility company headquarters employing several hybrid energy power generating methods which integrate to work together onsite thus producing substantially more energy power onsite-at businesses, factories, buildings and infrastructure, offshore aqueducts, and vessels. The hybrid utility service vehicles recycle, deliver and consigns surplus power. An assortment of unique electric generating devices include; wind turbine array integrated with PV solar panels sited on a tower, an array of hydroelectric turbine valves, and hydro-piezoelectric pipeline systems. various offshore power producing vessels do business with on shore utility grid companies ship to rent or sell hybrid energy battery containers for consignment locations, as well the grid connected mega ship comprising an off shore grid transmission control system which shunts net electrical energy underground sea to shore via a large scale cable network system which distributes extra power to on shore applications accordingly for profit, and also shunts extra electric energy to other off shore vessels for profit, and vessels can dock inland and dock off coastline to shunt net power to utility grid companies and ship hybrid energy battery containers to consignment locations globally.

6 Claims, 16 Drawing Sheets

200 HYBRID ENERGY SYSTEM

201. The hybrid energy system application employs an assortment of electric generating devices to partner and make more power together on the same location to increase energy production.

202. The hybrid energy system utilities headquarter mainframe is to manage renewable energy power generated by employed electric energy generating devices which work together on the same site thereby generating substantially more power AC /DC power for on site location.

203. A HES power control system manages components on a preferred location site which comprises an assortment electric generating devices, renewable energy wind turbines array integrated with and PV solar panels sited on a tower, an array of hydroelectric turbine valves, and hydro-piezoelectric pipeline systems.

204. The Hybrid Energy System utilities headquarter mainframe employs a satellite telecommunications network mainframe which accordingly manages system operations at preferred site's such as; business, factories, hospitals and as well homes, buildings and infrastruture, and off shore aqueducts, as well as mobile site vessels and HES hybrid utility service vehicles that recycle, deliver and sell HES surplus power.

205. The HES system controllers with sensor array manage the hybrid and integrated devices at the preferred site to produce surplus electricity power for use, consignment and to shunt surplus energy power to the grid via on and off shore via a preferred transmission cable network.

FIG. 2

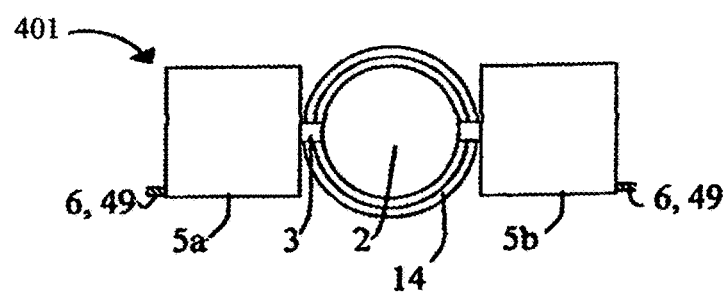
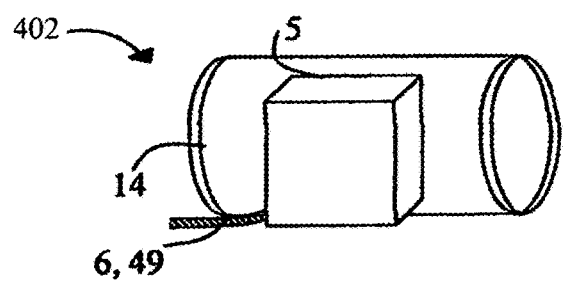
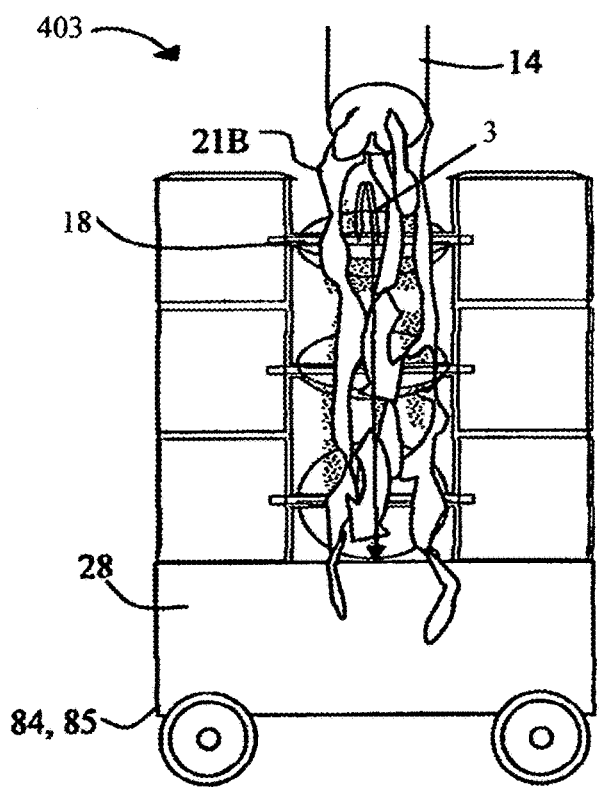
FIG. 4A

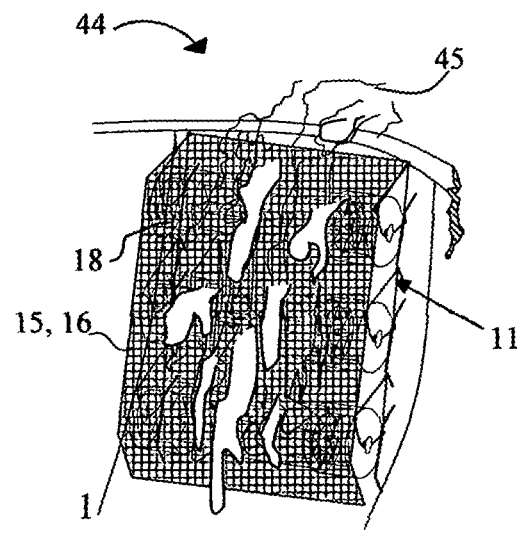
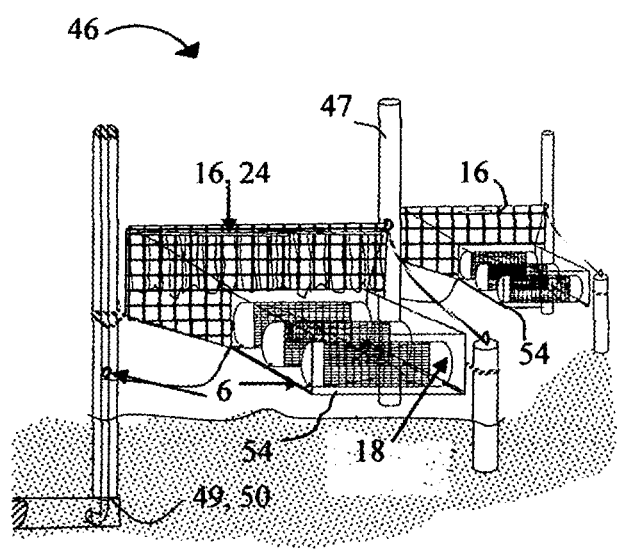
FIG. 8

HYBRID ENERGY SYSTEM

CROSS REFERENCED TO RELATED APPLICATIONS

U.S. Pat. No. 8,039,978 B2 Date: Oct. 18, 2011 title: Renewable Energy Power System, In: Gillett, and also U.S. Ser. No. 12/655,569 filed: Jan. 4, 2010, In: Gillett.

STATEMENT REGARDING FEDERALLY SPONSORED RESEARCH & DEVELOPMENT

Non Applicable

THE NAMES OF PARTIES TO A JOINT RESEARCH AGREEMENT

Non Applicable

BACKGROUND OF THE INVENTION

1. Field of the invention

The present disclosure relates to a hybrid energy system comprising collaborating kinetic energy turbine systems, turbine valves and pipes, solar power and piezoelectric devices which generate substantially more electricity at the same site, and also employs network controllers to manage the electricity power on site and off site accordingly.

2. Description of the Related Art

As related art discloses, it is generally well known that there are wind turbines, hydroelectric turbines, piezoelectric systems and solar energy systems that are placed accordingly at a setting to generate electricity power. For example, related art discusses an assortment of electric energy generating devices to work together on site which is sensible to reduce waste and carbon pollution.

The present hybrid energy system employs an assortment of electric energy generating devices to work together on the same site thereby generating substantially more power AC/DC power for on site location use.

A Hybrid Energy System or ("HES") utilities headquarter mainframe is to manage renewable energy power generated by sited components. Via satellite telecommunications the HES network mainframe manages system operations at preferred site's such as; business, factories, hospitals and as well homes, buildings and infrastructure, and off shore aqueducts, as well as mobile site vessels and hybrid utility service vehicles that recycle, deliver and sell HES surplus power.

Furthermore, the HES power control system manages components on a preferred location site which comprises an assortment electric generating devices, renewable energy PV solar panels set above wind turbines array integrate and set on a tower, an array of hydro hydroelectric turbine array and valves integrate with hydro-piezoelectric pipeline systems. The HES system controllers with sensor array manage the integrated devices at the preferred site produce surplus electricity power for use, consignment and to shunt surplus energy power to the grid via on and offshore transmission cable network.

SUMMARY OF THE INVENTION

The present hybrid energy system includes an assortment of electric energy generating devices to work together at the same thereby generating substantially more power on site by utilizing several employed methods which manage the AC and DC power at the location onsite. Via satellite telecommunications the network mainframe manages system operations at preferred site's such as; business, factories, hospitals and as well homes, buildings and infrastructure, and offshore aqueducts, as well as mobile site vessels and hybrid utility service vehicles that recycle, deliver and consign HES surplus power.

The Hybrid Energy System is a business with the utility company headquarters mainframe which is to manage renewable energy power generated by sited components. The HES comprises power control system thus manages the novel energy wind turbines can be integrated with and PV solar panels, the hydroelectric turbine valves, and hydro-piezoelectric pipelines are to work in combination and thus generate electricity power accordingly.

The hybrid energy producing components comprise HES system controllers with sensor array manage the hybrid and integrated devices on the preferred site, and also the controller methods listed in the following embodiments communicate the operation status by sensor monitoring so that the AC/DC power can charge battery banks on site and can shunt surplus electricity power to the grid via on and off shore transmission cable network.

BRIEF DESCRIPTION OF THE DRAWINGS

FIG. 2 depicts a flowchart for the hybrid energy system methods of operation.

FIG. 8 shows two perspective configurations of a hybrid energy method for a dam or spillway, and also for rivers, streams, and also a coastline tidal and wave system.

DETAILED DESCRIPTION OF THE DRAWINGS

Figure 1:
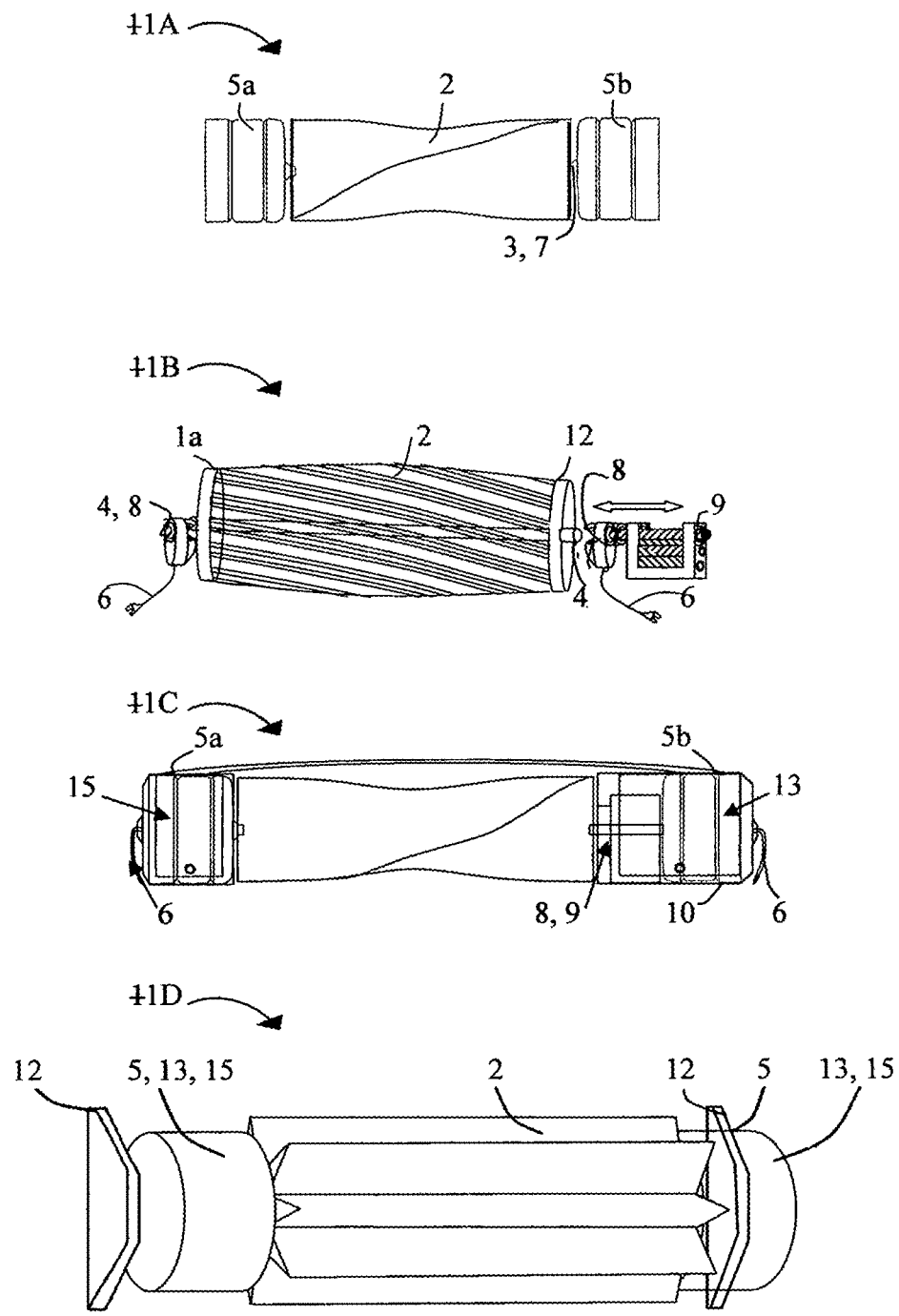
FIG. 1 shows perspective configurations of modular kinetic energy turbines 11A-11D.

Hereinafter, a hybrid energy system will be described in details with reference to the drawings and the identical parts in the drawings are assigned the same reference numerals.

Referring now in greater detail in FIG. 1, the hybrid energy system illustrates various configurations for the turbine unit 1A, 1B, 1C, and 1D compprising framework 1 which is to support thereon turbine components; axis rod 2, blade 3, shaft 4, generator 5, electrical wiring 6, bearing coupling 7, electromagnetic link coupling 8 for braking, gear box 9, nacelle encasement 10, anchor cable 11, support bracket 12, and controller 13 see FIG. 2 methods 1-11.

The HES controller 13 having system functions comprising microchip processors, sensor array, GPS, and the hybrid energy system network comprises cell phone and satellite communication monitors and manages the HES turbine apparatus.

The turbine unit can comprise materials made with preferred materials and electrical components which can be purchased from manufacturer.

FIG. 1 illustrates a configuration of the kinetic energy turbine 1A comprising one generator 5. When high velocity momentum is detected the turbine controller 13 manages an electromagnetic link coupling 8 can be engaged to crank and brake the shaft 4.

FIG. 1 illustrates a configuration of the kinetic energy turbine 1B comprising convex blades. Also, an electromagnetic link coupling 8 is to engage or disengage generator rotor 5 and with the blade rod 4. When high velocity momentum is present the turbine controller 13 manages an electromagnetic coupling switch to link coupling 8 with the shaft of the ratcheting gearbox 9 as shown by arrow to increase RPM's.

FIG. 1 illustrates a configuration of the kinetic energy turbine 1C comprising controller 13 to manage a gear box housed within a nacelle 10. The gearbox controller shuts down the electric magnetic coupling to prevent damage to the gearbox. The electromagnetic link coupling 8 and generator 5 are protected by encasement. The unit may include an optional collapsing handle 27.

FIG. 1 illustrates a configuration of the kinetic energy turbine configured as a hydroelectric turbine 1D comprising heavy duty blades with protective coating and submersible generators 5, and also having wire array 6, and supporting armature frame 1, cable 11, and bracket 12. The method of operation is to manage the operation for hydroelectric turbine functions wherein, the hydroelectric turbine controller 13, wherein preferred sensors detects kinetic energy driven turbines are activated by forced elements.

In greater detail FIG. 2 illustrates a flowchart for various hybrid energy producing methods for preferred Hybrid Energy System 201-205 in further detail:

Method 1: Hybrid Energy System site 93 comprises the network mainframe processor controller 13 having satellite communication and comprising cell phone satellite communication capability, telecommunication, and microchip processors and to thus manage from HES network headquarters.

Method 2: The controller 13 function wherein having cell phone satellite communication capability, and telecommunications, GPS and preferred sensor array 13 and thus, the control system 13 can send surplus energy to on site electrical components and can shunt extra power to the grid.

Method 3: The controller having cell phone and satellite communication monitored by network which comprising cell phone satellite communication capability, telecommunication, microchip processors, GPS, and sensor array 13.

Method 4: To manage the operations of power production systems working and the various methods manage system functions working on the site to produce electric energy successfully for use.

Method 5: The hybrid energy system produces energy from photovoltaic methods, wind and kinetic energy which drive turbine generator.

Method 6: Referring to a preferred site meaning position the HES array can be anchored in any given manner and placed accordingly such as horizontally or perpendicularly, to stack, or be in group alignment accordingly.

Method 7: HES functions show preferred locations meaning in and on ground, above ground on buildings and infrastructure, on and offshore vehicles, vessels, airplanes, which the HES flowchart illustrates from FIG. 3-FIG. 15.

Method 8: HES functions illustrated discuss the operations of wind turbine and the wind turbine with PV solar power integration and their functions for energy production.

Method 9: HES functions illustrated discuss the operations of hydroelectric turbines work in bodies of water, conduit, pipelines which can comprise controlled valve integration and their functions for energy production.

Method 10: HES functions discussing the operations for hybrid vehicles which comprise functions for energy production.

Method 11: FIG. 2 Flowchart components for Hybrid Energy System 93.

The Hybrid Energy System 93 comprising the following contrivances:

frame 1, axis rod 2, blade type 3, shaft 4, generator 5, electrical wiring 6, bearing coupling 7 electromagnetic link coupling 8, gear box 9, nacelle encasement 10, cable suspension 11, and bracket 12, controller having GPS/cellular communication 13, conduit pipe 14, structure compartment with access means 15, vent guard 16, turbine valve device 17 including controller 13, kinetic energy turbine array 18, or KET array 18 conveyer system 19, debris claw 20, forced substance 21, piezoelectric device with crystals 22, flexible coating 23, piezoelectric array 24, piezoelectric pipe valve controller 25, portable wind turbine power system 26, collapsing handle 27, battery array 28, portable battery caddy with controller charger having GPS 29, hybrid solar power and wind turbine telescope device 30, solar panel or film 31, motorized rotational device 32, actuator telescoping device 33, stand 34, veranda/colonnade 35, hybrid building/structure 36, turbine window unit 37, forced air duct for turbines and piezoelectric devices 38, hybrid renewable energy turbine array 39, tower 40, infrastructure pipeline 41, hydroelectric aqueduct 42, aqueduct tunnel 43, dam turbine array 44, spill stream or river 45, wave or tidal turbine array 46, eddy 47, buoy 48, insulated cable and plug 49, network grid cable 50, hybrid mega barge 51, off shore kinetic energy turbine farm 52, power plant headquarters 53, hybrid energy array 54, submarine vessel 55, robotic armature 56, overpass, underpass or bridge 57, piezoelectric array and vented housing 58, turbine array in vented housing 59, tunnel 60, hybrid service station 61, network control system unit 62, plug in portal 63, charging store 64, hybrid utility service vehicle 65, trailer 66, hybrid battery container with controller having GPS 67, hybrid electric car 68, hybrid train or light rail 69, hybrid consignment mobile van 70, hybrid autonomous vehicle 71, smart drive remote controller 72, a portable mobile system either wheels, motorized casters, or robitic omniwheels 85 with microprocessor programmed for voice and user control 73, hybrid motorcycle 74, hybrid ATV or sport vehicle 75, hybrid airplane 76, jet motor 77, electric motor 78, hybrid passenger blimp 79, hybrid remote controlled blimp 80, hybrid solar film and piezoelectric inflatable 81, helium tank with controller 82, tether cable and power wire harness 83, autonomous cart base 84, omniwheel motorized casters 85, controller 86, charger gauge 87, in source 88 and outsource power outlet 89, and battery housing 90, autonomous carrier 91, door hatch controller 92.

Figure 3:
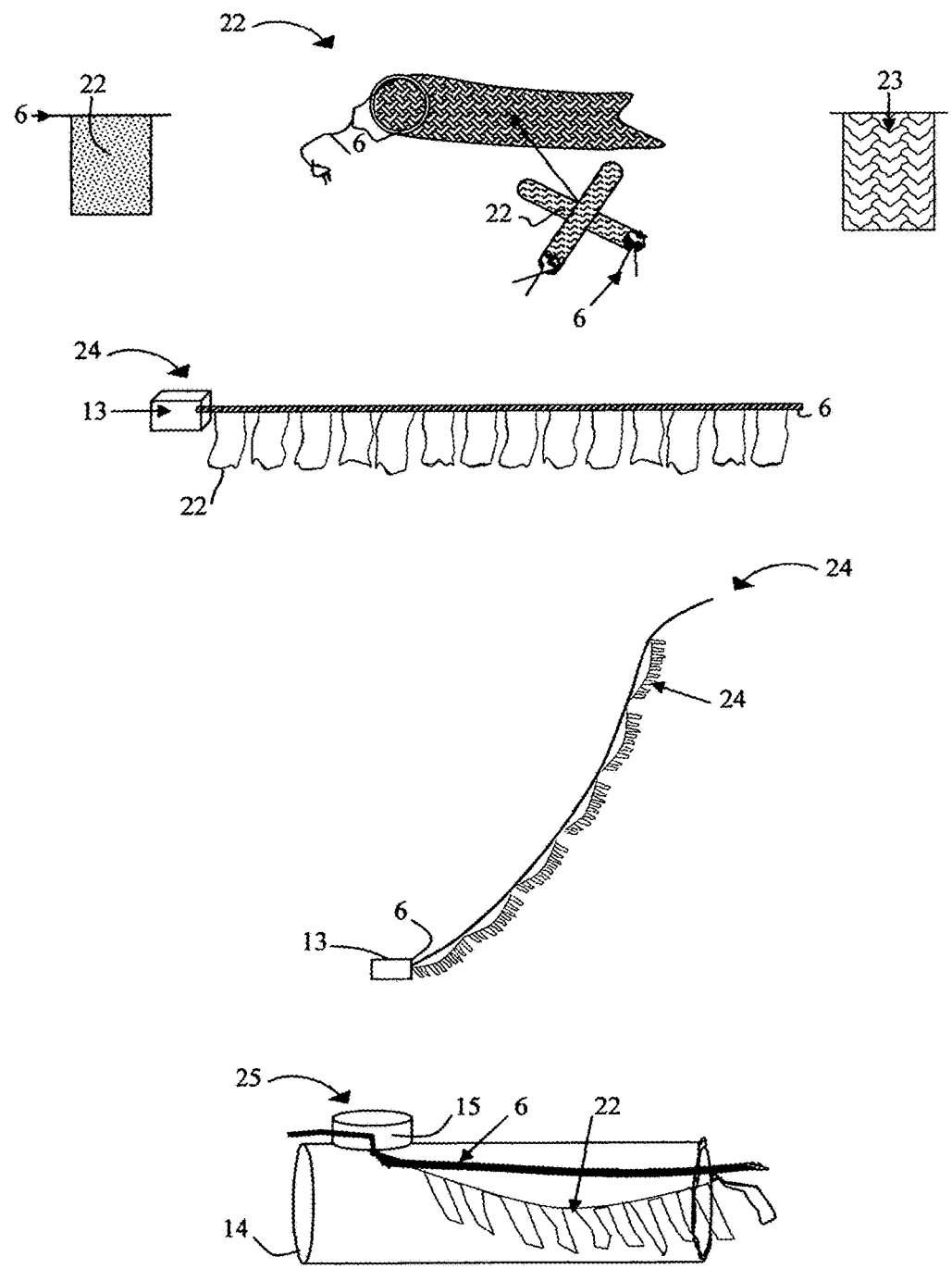
FIG. 3 show perspective configurations of kinetic energy piezoelectric panel methods and a kinetic energy turbine valves integrated with piezoelectric panels.

Referring now in greater detail in FIG. 3, a hybrid energy system illustrates a configuration of various piezoelectric devices and application methods, the system comprising: a conduit pipe 14, a structure compartment with access means 15, the piezoelectric device comprised with crystals 22, a configured with a flexible coating 23, piezoelectric array 24, a piezoelectric pipe valve 25 with controller having cell phone and satellite communication method.

In various aspects the piezoelectric kinetic energy method is comprising various piezoelectric devices which can be activated by wind, water, also by pressurized force. As well, said piezoelectric devices work in novel applications such as set inside pressurized pipes, and inside a vented housing, and also in pipelines placed wherever. A building with air ducts and an air conditioning system can integrate the said piezoelectric array to generate electricity power, and also wire 6 connects to control system sensors placed where ever suited to see the an activity is being carried out.

Referring now in greater detail FIG. 4A shows various mobile kinetic energy turbine arrays that can be set under a pipe 14 and as illustrated water or liquid which forcefully activates blades crank generators rotors. The pipe array can be transported autonomously.

In greater detail in FIG. 4A as illustrated water or 21B liquid which forcefully activates blades 3 crank generator rotors. The kinetic energy turbine array 18 can be transported by an autonomous cart 84 and accordingly power can be stored in battery bank 28.

Referring now in greater detail in FIG. 4A, the hybrid energy system illustrates a configuration of a turbine valve device with gasket flange 17. The kinetic energy turbine "KET" 18 comprises at least three turbine units having desired blades. The kinetic energy valve is managed by a device controller having GPS 13 and the pipe 14 which can be contained within compartment with an access hatch 15. A funnel vat empties into a vent guard 16 allows forced matter to drop into the KET array. An autonomous pipe valve with controller having cell phone and satellite communication can be monitor by the network. When a malfunction happens a sensor signals the controller to shut valve flange therein.

Figure 4B:
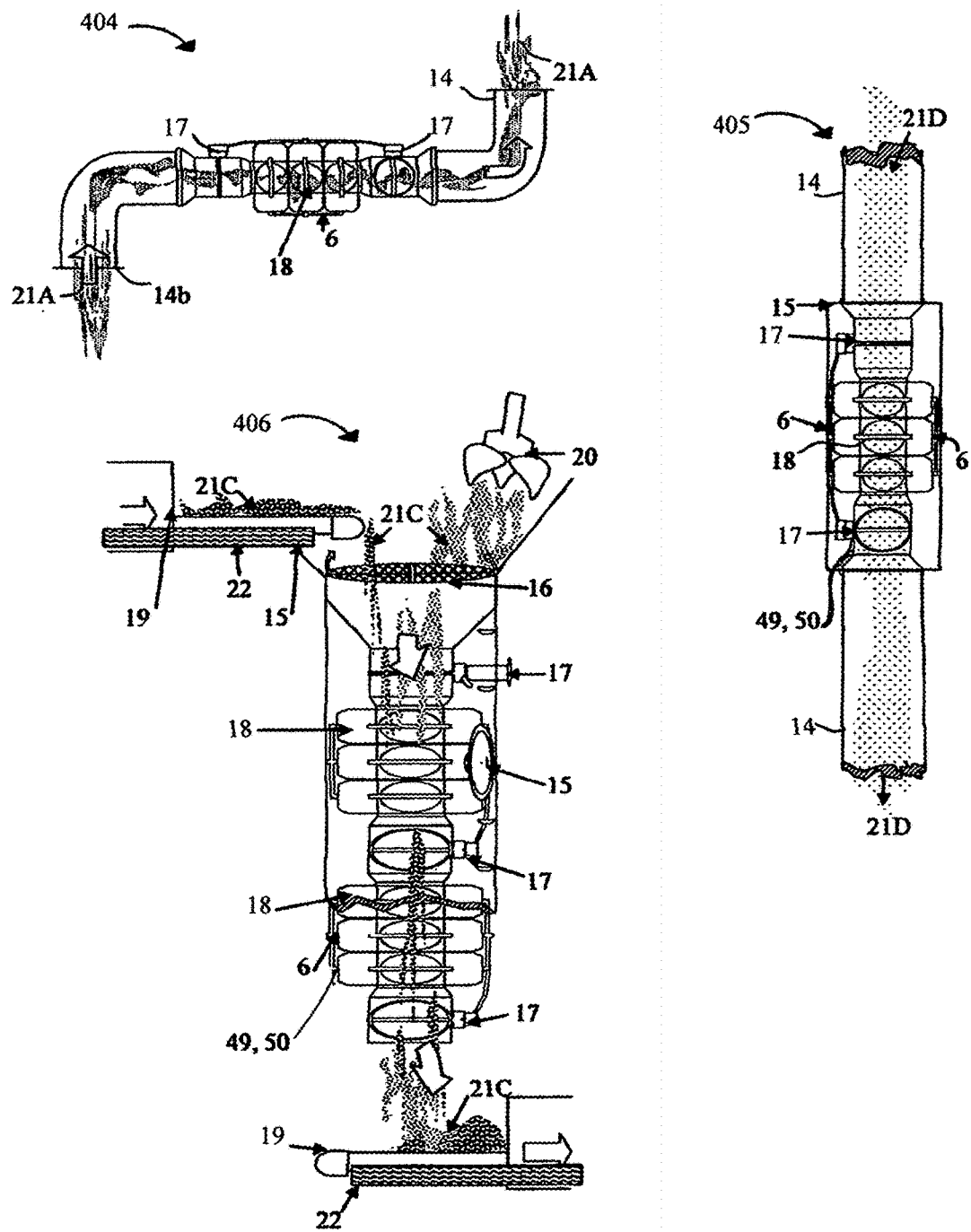
FIG. 4A shows perspective configurations of kinetic energy force to activate turbine blades for pipe and valve applications in drawings 401-403, and FIG. 4B pipe and valve applications in drawings 404-406.

Referring now in greater detail FIG. 4A shows a mobile caddy 28 for portability which can utilize motorized wheels and autonomous robotic omniwheels 85, FIG. 4A and FIG. 4B show perspective configurations of kinetic energy force to activate turbine blades for pipe and valve applications in drawings 401-406. The hybrid energy system illustrates various piezoelectric devices and application methods, piezoelectric device with crystals 22, a plausible flexible coating 23, piezoelectric array 24, piezoelectric pipe valve with controller having cell phone and satellite communication 25, a portable wind turbine power system 26.

Figure 6:
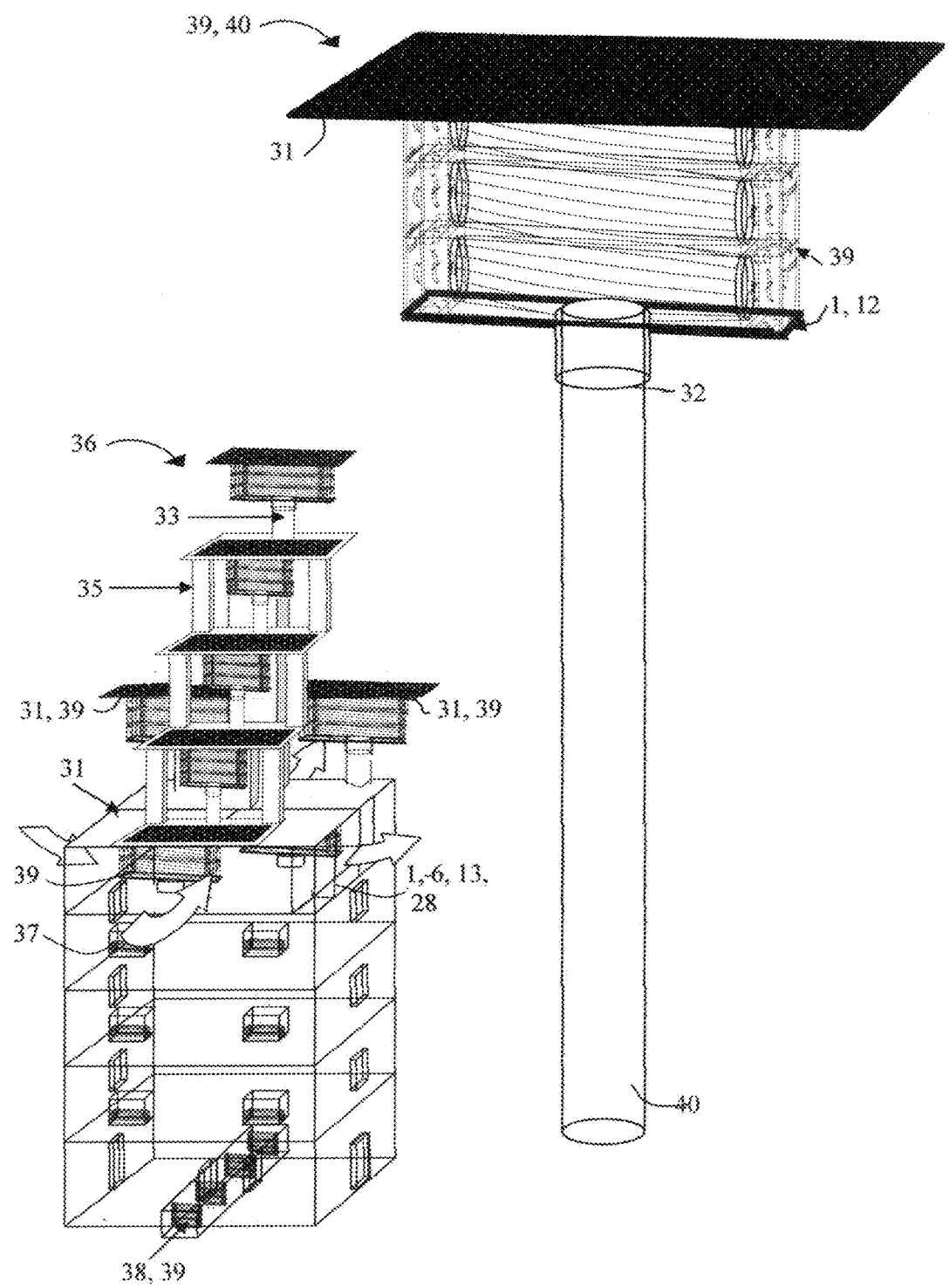
FIG. 6 show perspective configurations of wind turbine units and solar power device situated on a stacking modular tower, and also a giant hybrid system for wind turbine parks comprising a wind turbine array with a giant solar panel.

As FIG. 4A illustrates kinetic energy methodology including processes 401, 402, 403 comprising various piezoelectric devices can be activated by wind, water, also by pressurized force as processes 404, 405 and 406 illustrate in FIG. 4B. As well, said piezoelectric devices work in novel applications such as set inside pressurized pipes, and inside a vented housing, and also in pipelines placed wherever as illustrated in FIG. 6-FIG 10. A building with air ducts and an air conditioning system as shown in FIG. 6 can integrate the piezoelectric array to generate electricity power, and also wire 6 connects to control system sensors placed where ever suited to see the an activity is being carried out.

The conveyer system 19 for process method 406 allows matter flow to spill out onto the vent guard and fall onto blades. A debris claw 20 allows forced matter and ingredient substance 21 to dump out onto blades and fall though to exit downwardly.

The kinetic energy method comprising various piezoelectric devices can be activated by wind, water, also by pressurized force. As well, said piezoelectric devices work in novel applications such as set inside pressurized pipes, and inside a vented housing, and also in pipelines placed wherever. A building with air ducts and an air conditioning system can integrate the piezoelectric array to generate electricity power, and also wire 6 connects to control system sensors placed wherever suited to see that an activity is being carried out.

Referring now in greater detail FIG. 3, and FIG. 8-FIG. 10 showing KET processes, the hybrid energy system illustrates the configurations for various piezoelectric devices and application methods, piezoelectric device with crystals 2, a plausible flexible coating 23, piezoelectric array 24, piezoelectric pipe valve with controller having cell phone and satellite communication 25, a portable wind turbine power system 26.

Respectively, one of many aspects the kinetic energy turbine methodologies are integrated with piezoelectric devices activated by wind, water, also by pressurized force to work in novel applications. As FIG. 4A and FIG. 4B illustrate kinetic energy methodology in FIG. 4A including process 401, 402, 403 comprising various piezoelectric devices can be activated by wind, water, also by pressurized force as processes 404, 405 and 406 illustrate. As well, piezoelectric devices work inside pressurized pipes, and inside a vented housing, and also in pipelines placed wherever as illustrated in FIG. 406. A building with air ducts and an air conditioning system as shown in FIG. 6 can integrate the piezoelectric array to generate electricity power, and also wire 6 connects to control system sensors placed wherever suited to see that an activity is being carried out.

Figure 5:
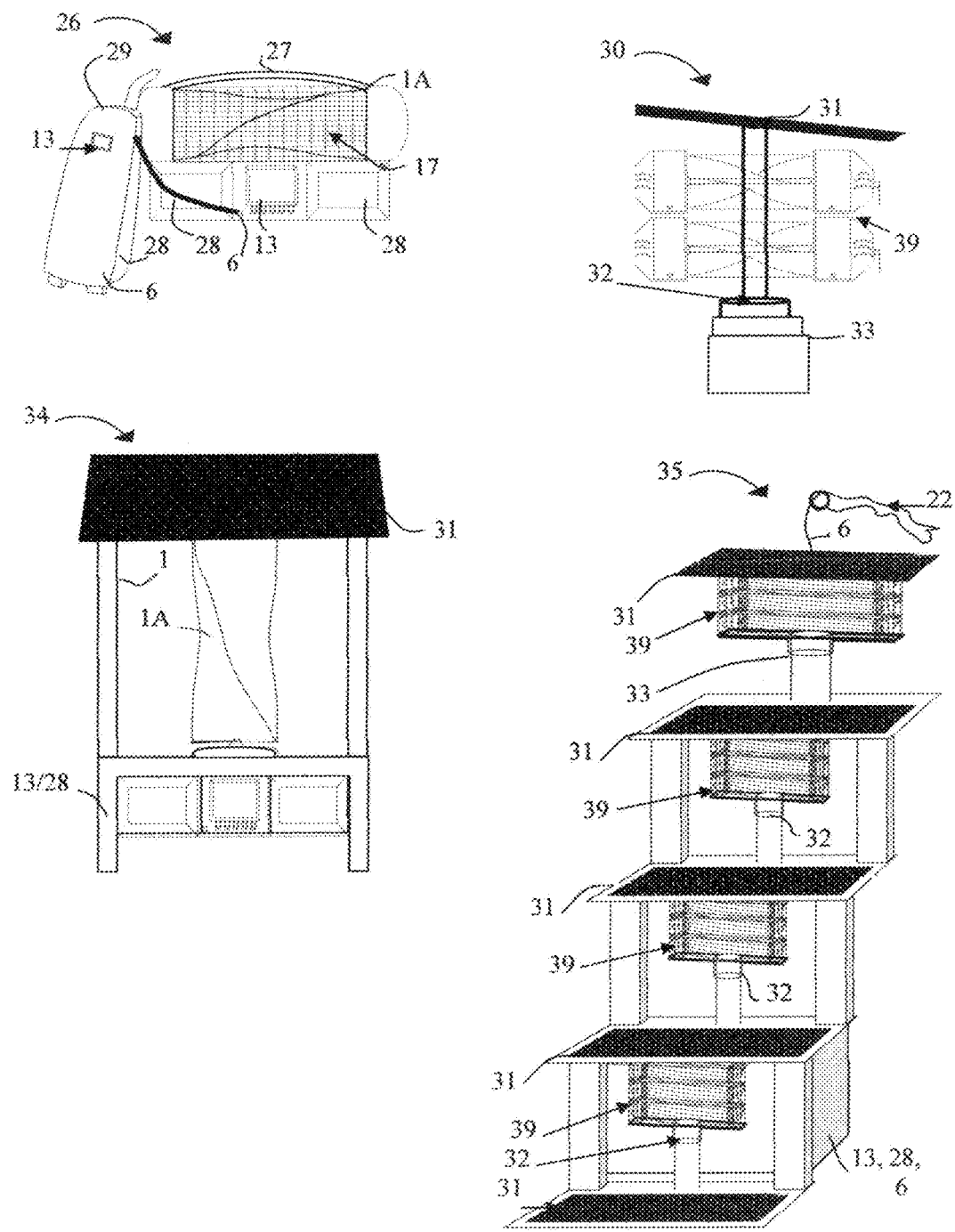
FIG. 5 shows perspective configurations of various portable wind turbine units, a portable snap on solar power device, and also a configuration of a stacking modular tower, and also a giant hybrid wind turbine array with a giant solar panel.

Referring now in greater detail in FIG. 5 and in FIG. 6 the hybrid energy system illustrates wind turbine units shown in FIG. 1, the wind turbine 1A works as portable hybrid wind turbine and solar panel unit, and also the wind turbine 1B is integrated with modular hybrid renewable energy methods for the wind turbine array 39 integrated onsite with solar panel or film 31 for energy production.

FIG. 5 shows a portable wind turbine power system 26 with vent guard 16 includes a collapsing handle 27, at least two 12V batteries 28 and a portable battery caddy 29 with controller having GPS 13 with cable plug, outlet and inlet, and also wire 6 arrays with sensors. The caddy 29 comprises wheel casters which can work as well for the portable hybrid energy system 39, and can also work for the portable KET system.

FIG. 5 shows the modular wind turbine pole or tower 30 comprising a frame 1 which includes a solar panel or film 31 set above the V/H wind turbine array, and including a motorized swivel device 32 comprising a control system including microchip process for control, and an optional actuating telescoping device 33.

Figure 9:
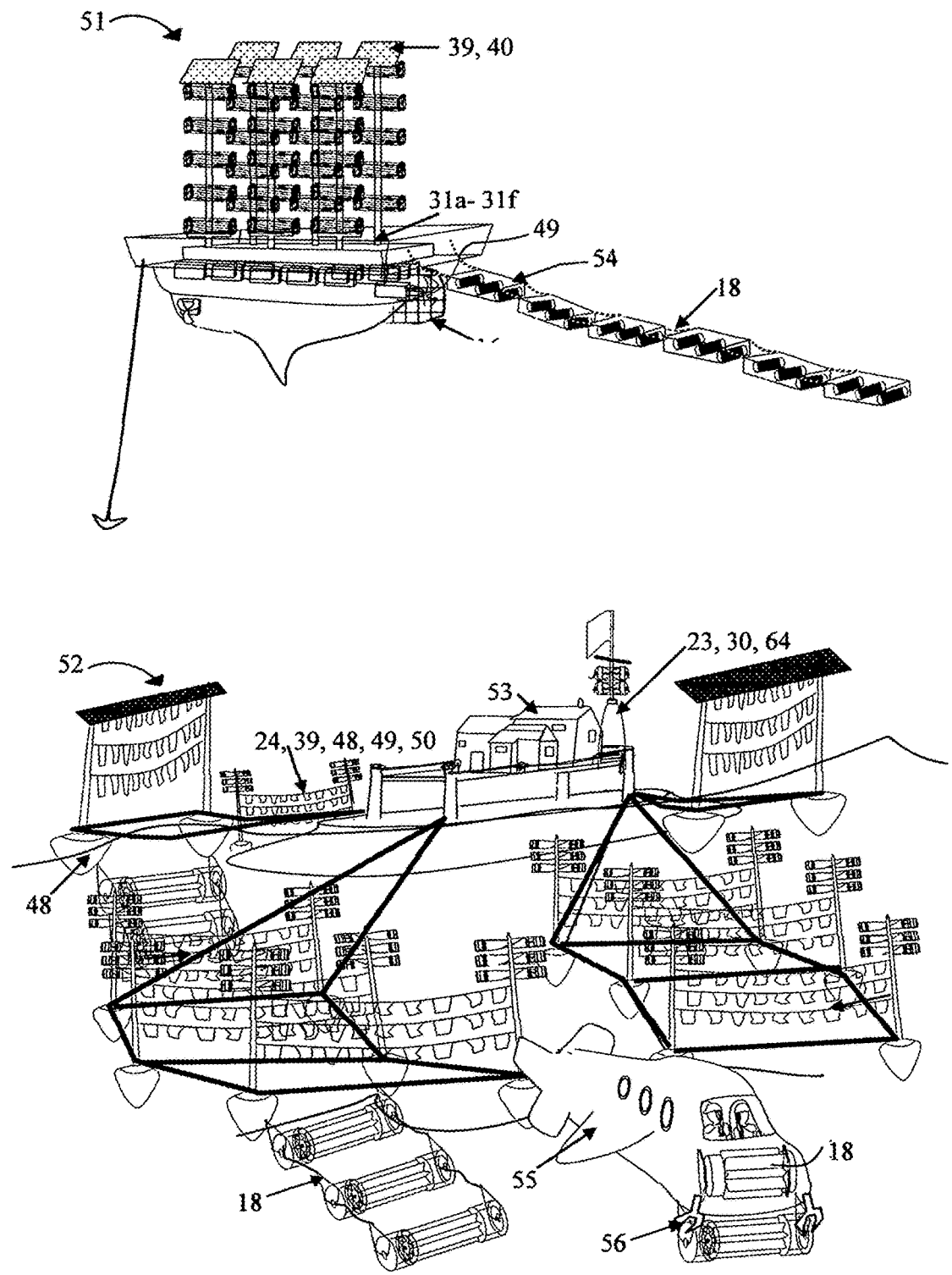
FIG. 9 shows a perspective configuration of hybrid energy system mega vessel configuration of a barge and of a mega vessel integrated with an off shore business enterprise and an off shore power plant system having various hybrid energy devices which operate on and below the ocean surface, and also a configuration of an off shore service station.
Figure 10:
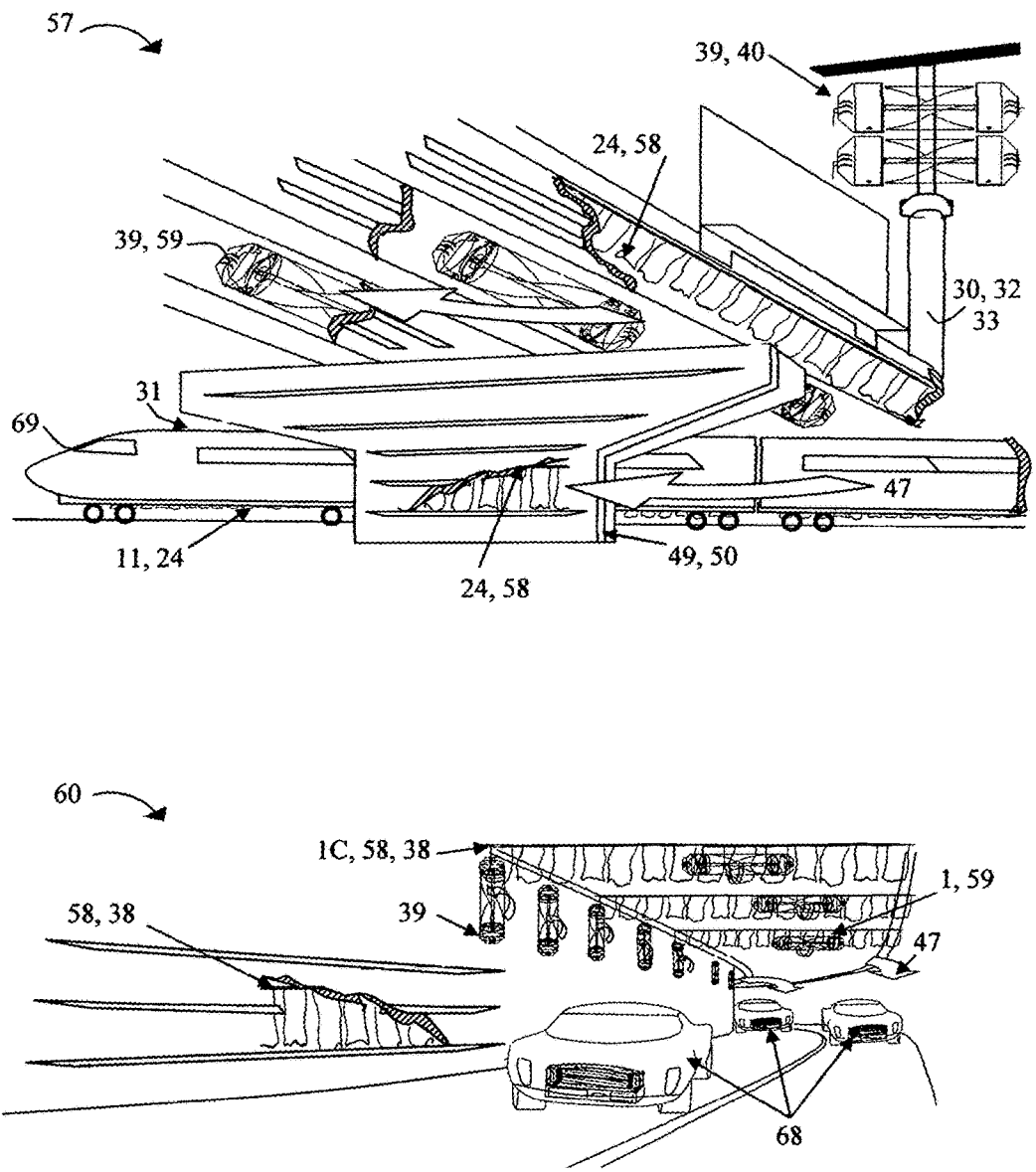
FIG. 10 shows perspective configurations of the hybrid energy system integrated with an overpass and an underpass, and shows a high speed rail system, and also shows a tunnel hybrid energy system.
Figure 11:
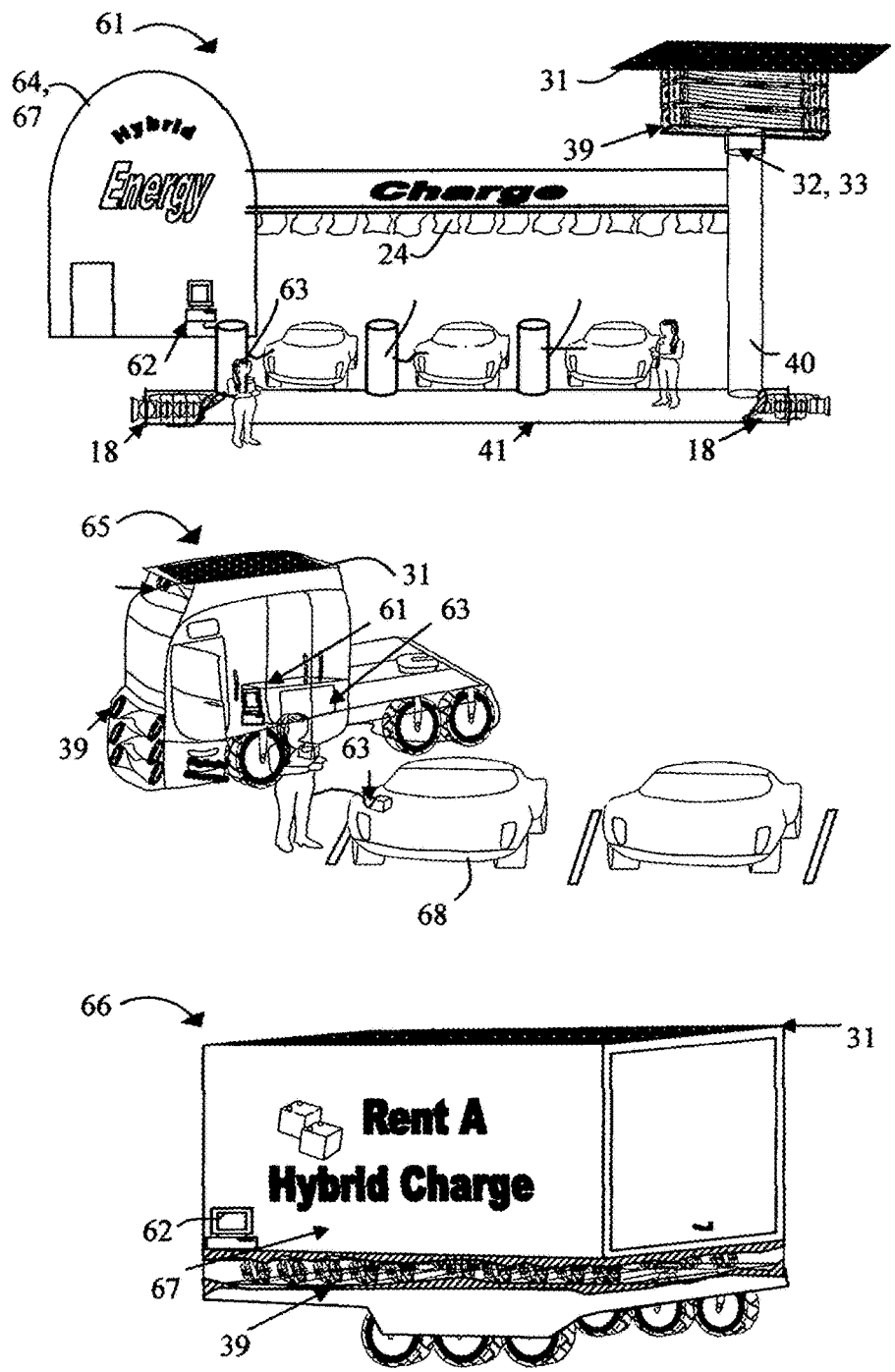
FIG. 11 shows a perspective configuration of the HES merchant service station and service vehicles, and battery charging methods for an autonomous battery charging container.

FIG. 5 shows a modular hybrid solar power and wind turbine telescope device 30 set as a pinnacle of a roof, a building, infrastructures, and also can be set near or on a vehicle to charge batteries and to furnish on demand power, shown in FIG. 6, and in FIGS. 9-11.

FIG. 5 shows a portable stand 34 with hinges supporting the wind turbine power system 26 which can also be mobile to include wheels, and can support at least one solar panel 31 that snaps on and off the frame which can collapse, the stands base comprises at least two 12V batteries 28 and a battery charger 13 including a charging control system 13, and also the portable stand can comprise wheels, not shown, and having a preferred anchoring method and according the frame 1 supports at least one solar panel to be placed directly above the wind turbine 1A or wind turbine array 18 either horizontally or vertical positioned.

FIG. 5 also shows a stackable modular awning 35 set to piggy back which exposes solar panels better, as well as allows concentrated wind speed to contact said wind turbine units depicted in FIG. 1 kinetic energy turbines see FIG. 1A, 1B, and in 1C accordingly activates the turbine's blades 2.

FIG. 5 shows a plurality of modular awnings 35 are to set on the ground, as well as to set on the roof of a skyscraper, a building, and on land turbine farms also sited wherever else suited.

FIG. 5 shows various portable wind turbine units which may or may not include a portable snap on solar power device that can comprise a controlled motor with sensors to automatically adjust by actuating to tilt and swivel into the direction of the sun.

Referring now in greater detail in FIG. 6, the hybrid energy system illustrates a configuration of various kinetic energy turbine devices and application methods on and in a building 36 with stacking modular awnings 35.

FIG. 6 shows a hybrid building 36 which includes the wind turbine array integrated with and solar power 31 arrays. Accordingly the hybrid energy system wind turbine and solar panel array can be sited differently than this building illustrates.

FIG. 6 shows a configuration of the wind turbine array 39 which can be set adjacent to a building 36 site. The wind turbine 39 comprises at least one wind turbine unit, shown in FIG. 1. As shown a wind turbine array is a stacking array numbered as 39 which sets upon a giant motorized tower 40. The wind turbine tower 40 automatically swivels into the wind via a controller motor 32.

Accordingly the giant wind turbine farms can employ wind turbine array supported by giant towers. The HES site 93 depiction for a wind turbine farm may be set on and offshore.

Referring now in greater detail FIG. 7, the hybrid energy system illustrates a configuration of perspective configurations of hydroelectric infrastructure for a pipeline 41 and an aqueduct above ground 42, and also an aqueduct below ground 43.

The configuration for a pipeline 41 is shown integrating turbine valves 17, and piezoelectric pipe inserts 25, and system pipe 14 without a device. The pipe is housed underground or is housed on a preferred site such as at a factory supplied by pipeline systems.

The underground pipeline 41 harnesses the insulated wire 6 and sensor array, not shown. The pipeline 41 also accommodates and houses underground network power grid cable 49.

Figure 7:
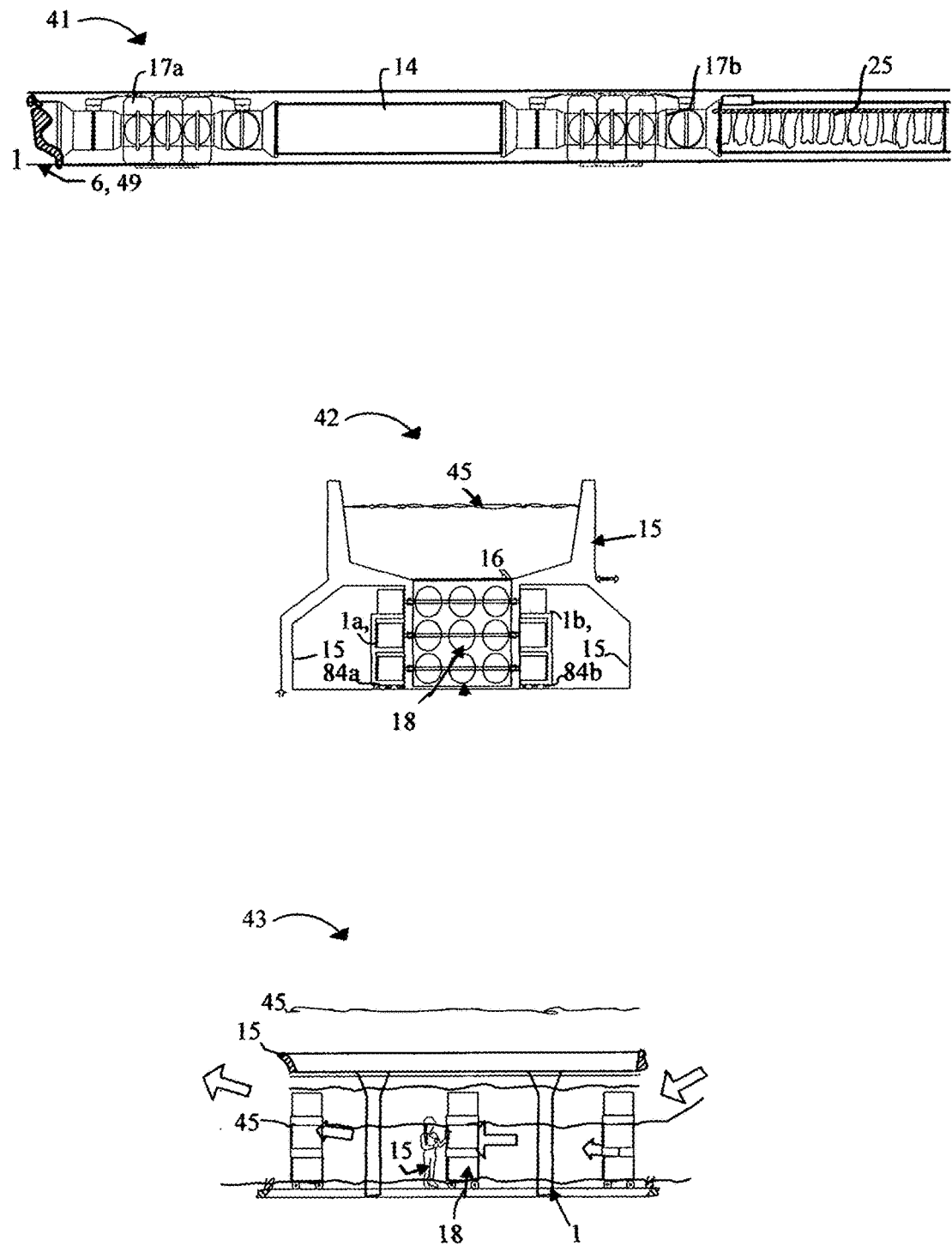
FIG. 7 shows a perspective configuration of infrastructure pipeline integrating hydroelectric and piezoelectric systems which are above and below ground level aqueducts, and work also as thermoelectric power stations.

Also in FIG. 7 the hybrid energy system illustrates an aqueduct site 42. The hydroelectric turbine array 18 is supported by armature frame 1, which can be wheeled around to access via internal structure 15 right or 15 left.

As shown a vent guard 16 allows the maintenance worker access and also is eco friendlier for fish. The generators are set on the internal side 15 and the water flow 45 is channeled to turn the hydroelectric turbine array 18 generators and blades 1.

As shown in FIG. 7 the hybrid energy system illustrates an aqueduct below ground 43. The hydroelectric system is set underground where water is natural forced to enter and exit as shown by the arrows. The subterranean aqueduct 43 is ideally suited to be placed under rivers and streams. Similar to an aqueduct above ground 42 the subterranean aqueduct 43 is supported by a pillar frame 1.

The internal structure 15 allows the maintenance worker access and also a vent guard is set vertically at the aqueduct entrance. The generators are set on the internal side 15 and the water flow 45 is channeled to drive the hydroelectric turbine array 18 generators and blades.

Referring now in greater detail FIG. 8, the hybrid energy system illustrates a configuration of a dam 44 with or spillway. The hydroelectric turbine 1D having heavy duty blades with protective coating and sealed generator referenced in FIG. 1 is anchored or is suspended by cable and thus directly set in the spill flow 45. Network cable 49 and 50 are controlled by the HES system 13 accordingly.

As shown in FIG. 8 the control system 13 sends surplus energy to on site electrical components and can shunt extra power to the grid. A hydroelectric aqueduct can be dams and spillways above ground and also tunneled underground. A hydroelectric turbine array can be set on a beach to capture wave and tide force.

As shown in FIG. 8, a configuration of a wave that impacts and activates the tidal turbine array 46 anchored off shore by eddy 47. The underground network cable 49 and 50 is buried beneath as shown cut through. A floating buoy and a pilling can stabilize a wafting tidal turbine array 46 anchored on the water surface 46 or on a spillway, and on rivers and streams docks or ocean side piers and locks.

Referring now in greater detail FIG. 9, a hybrid energy system illustrates hydroelectric energy producing methods for tidal hydroelectric energy producing methods and in FIG. 9, hybrid barge 51 is comprising a wind turbine array 39 and solar power panels, and also the motorized tower 31, hydroelectric turbine housing 54 which is towed, and includes the control system 13 that manages the battery charging process which shunts power to another vessel or shunts extra power to an on shore grid network.

Referring now in greater detail FIG. 9 showing a hybrid vessel 52 including a wind turbine array 39 and solar power panels, and also the motorized tower 31, hydroelectric turbine housing 54 which is towed, and vent guard 16 protect the propeller 56, and also insulated wire 6 and cable 49 subsequently connects with network grid cable 50. A control system 13 sends surplus energy to on site electrical components and can shunt extra power to the grid.

In FIG. 9, process 52 shows an offshore hybrid power plant integrated with an offshore business merchant enterprise for an off shore service station and battery charge methods to extend long range mileage for a vessel or mega barge, and also a control system 13 sends surplus energy to onsite electrical components and the controller shunts net power to an onshore utility grid network.

The hybrid energy system comprising novel hydroelectric mega vessels can float an offshore, and comprising a utility grid transmission system which stores kilowatts in battery containers and battery pods to consign net power later on.

An offshore grid network comprising a grid transmission network control system which collaborates with said mega vessels and barges to stock pile voltage onboard in a battery container, and also controls the container devices pending outcrop shipment.

Also the mega vessel is comprising a merchant process for shipping and renting battery containers to utility grid companies and also to businesses onshore and also to cruise lines for emergency power.

FIG. 9 illustrates an offshore grid company transmits electrical energy underground sea to shore cable system to distribute net power onshore accordingly. A mega vessel garages a novel hybrid submarine which is employed for underwater hydroelectric power system monitoring and maintenance. An offshore headquarters 53 and an off shore power plant system 52 having various hybrid energy devices flexible coating 23, piezoelectric array 24, hybrid solar power and wind turbine telescope device 30, kinetic energy turbine array 39, buoy tower 48, charging store 64, and also with insulated cable and plug 49 which subsequently connects with network grid cable 50.

FIG. 9 illustrates a sub vessel 55 maintenances the turbine farm with robotic armature 56 is shown to be clasping on to hydro-turbine underneath the sub vessel 55 which operates in the ocean surface.

Referring now in greater detail FIG. 10, a hybrid energy system illustrates a configuration of methods for infrastructure system utilizing hybrid energy to powering bridges and tunnels. The preferred kinetic energy turbine sites can be modular units placed on existing roof tops, land farms and offshore power plants. A novel hybrid energy system integrates with infrastructure, roadways, under and overpasses, roadways, bridges, tunnels.

The hybrid energy system controller process manages multiple power production systems on site and automatically shuts down power production to prevent overload via the control system 13 sending surplus energy to onsite electrical components and can shunt extra power to the utility grid.

FIG. 10 is showing a depiction of an overpass and underpass 57. The overpass and underpass are shown as comprising wind turbine solar power panel 31, 33 piezoelectric panels 24 are sited in a vented housing with ducts. A HES site for a high speed rail train 69 depicts the action to cause turbulent activity to activate the turbine units thereby generating electric energy for said HSR/train power and for neighboring sites.

Also FIG. 10 is showing a depiction of a tunnel 60 comprising HES piezoelectric panels 24 housed in the site ceiling. A cut through view shows the ceiling and the wall 15 having said elongated vented ducts and also the wind turbine unit FIG. 1C which are housed in the ceiling and wall ducts. A control system 13 method sends surplus energy to onsite electrical components and can shunt extra power to the grid.

As shown in FIG. 10 the tunnel lights and pumps are powered by generators and piezoelectric devices activated by kinetic energy air turbulent (eddy's shown by arrows 47). The electric cars 68 show the portable wind turbine unit 26 is set inside the front boot to extend long range mileage.

Referring now in greater detail FIG. 11, the hybrid energy system illustrates perspective views of hybrid energy powering station and battery bank consignment and battery charge methods to extend an electric vehicle's 68 long range mileage.

The hybrid energy commercial vehicle and the service stations ship generated power to rural and metro homes, buildings, and to communities on and off grid power. Accordingly a vehicle type can utilize the renewable energy power system and wind turbine apparatus in various ways for consumer applications and electrical components indoors and out.

One or more wind turbine apparatus can be anchored in any given manner with and without a vented housing, and placed accordingly such as horizontally or perpendicularly, to stack, or be in a group alignment inside and outside the vehicle cab and vehicle body as shown with utility vehicle 65 and commercial vehicle 70.

As shown FIG. 11 illustrates the kinetic energy power service station 61 site can be situated over an underground water treatment plant and pipe network system 41 with aforesaid valves, and also wind and solar array solar panel or film 31, motorized rotational device 32, actuator telescoping device 33, stand 39 and a giant tower 40. As well, the station is self service store 64 which houses the battery 67. The station is self service store 64 also stores and sells portable charge containers 67 which can be consigned by a business to charge employees vehicle's at work and thus container remains on site until nearly spent upon the next replacement scheduling via automated control system 62 with payment such as a Pay Pal system.

As shown in FIG. 11 an automated control system 62 and payment system, and a plug-in charge port 63 a, 63 c, and provide as service application by shipping and delivering, exchanging and recycling spent battery's for fully charged batteries.

As shown in FIG. 11, a utility vehicle 65 provides a service which is on call or via an appointment in order to charge and recycle spent electric vehicle batteries as the depictions shown the car 68 is being charge in a parking lot as controller 62 automatically manages charge plug in portal 63, and also battery 67 storage level.

As shown in FIG. 11, a kinetic energy power service utility trailer 66 delivers a fully charged battery container to homes, businesses, and also does not discuss hospitals and when power is nearly depleted the hybrid energy controller 62 automatically schedules a time to deliver a fully charged battery container 67.

Figure 12:
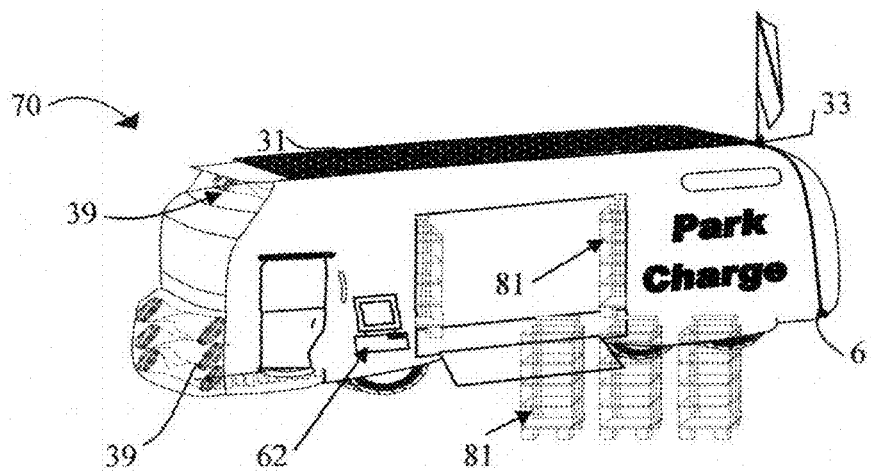
FIG. 12 shows perspective configurations of a hybrid energy system for a battery charging consignment van 70.

Referring now in greater detail FIG. 12, a hybrid energy system illustrates a configuration of various shows a perspective configuration of a commercial vehicle 70 and service which ships transportation-all generated power to rural and metro homes, buildings, and to communities on and off grid power.

As shown in FIG. 12 accordingly a vehicle type 70 for a consignment van can utilize the renewable energy power system and wind turbine apparatus, see FIG. 1. In various ways for consumer applications such as shipping and delivering, exchanging and recycling spent batteries for fully charged batteries 81a-81e.

The vehicle may or may not include the piezoelectric flag 33 or the solar panel 31. An automated control system 62 and payment system to plug-in charge port 63a, 63c.

Figure 13:
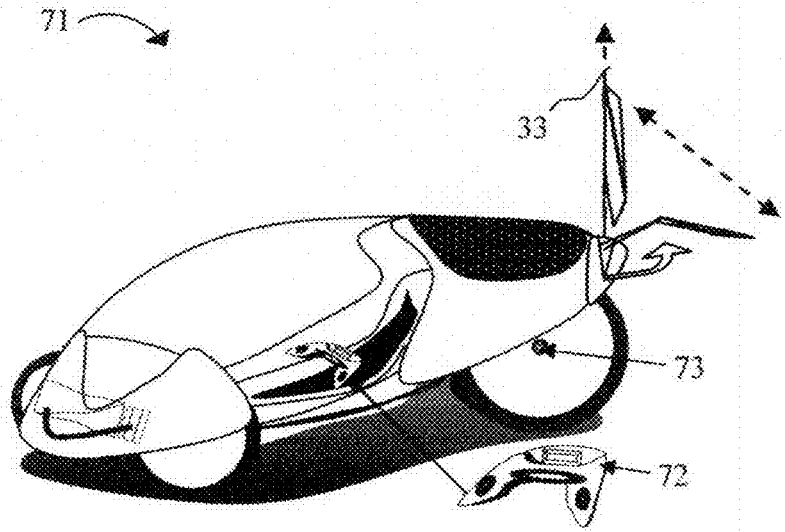
FIG. 13 shows perspective configurations of the hybrid energy system for vehicles.

Referring now in greater detail FIG. 13, a hybrid energy system illustrates a configuration of a hybrid energy vehicle 71 with inner-motorized wheels that are omni2directional 73, a piezoelectric robotic armature that is activated when vehicle is started.

In FIG. 13 the controller manages a telescoping actuator that opens a door hatch 33 (depicted by arrow) allows piezo-flag 23 to pop out, and when parked to lower back down and shut the door hatch. A vehicle type may or may not include the door hatch device 33 to rise up and out. The hand held remote controller 72 acts as a steering wheel and a foot pedal stops the omniwheel 73.

Figure 14A:
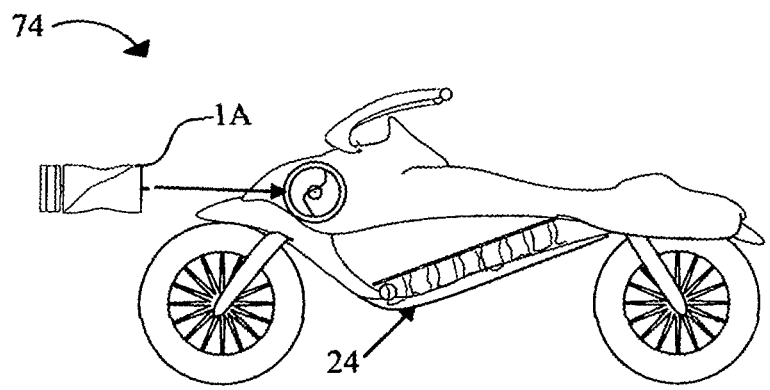
FIG. 14A shows a perspective configuration of an all-terrain vehicle.
Figure 14B:
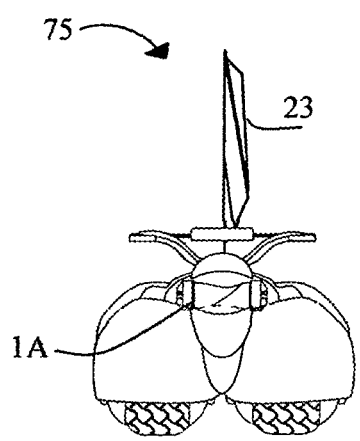
FIG. 14B shows a perspective configuration of a motorcycle.

Referring now in greater detail FIG. 14A, a hybrid energy system which illustrates a configuration of a compact vehicle, motorcycle or FIG. 14B configured as a golf cart, and also an all-terrain vehicle can have the option to engage a second generator at high velocity speeds and also to disengage the second generator when speed is reduced. The turbine unit extends an electric vehicle's long range mileage until parked for battery recharging process.

As shown FIG. 14A, a HES motorcycle 74 is a utility terrain vehicle and a cart too that can employ at least one or more wind turbine apparatus 1A. A vehicle controller 13 can furnish HES net voltage to motor(s) 78 and components inside and outside the vehicle body and extends an electric vehicle's long range mileage until parked for battery recharging process. The motorcycle may or may not include piezoelectric-flag 24.

FIG. 14B shows an ATV 75 comprising one wind turbine apparatus 1A can be anchored in any given manner with and without a vented housing, and placed accordingly such as horizontally and extends an electric vehicle's long range mileage until parked for battery recharging process.

Figure 15:
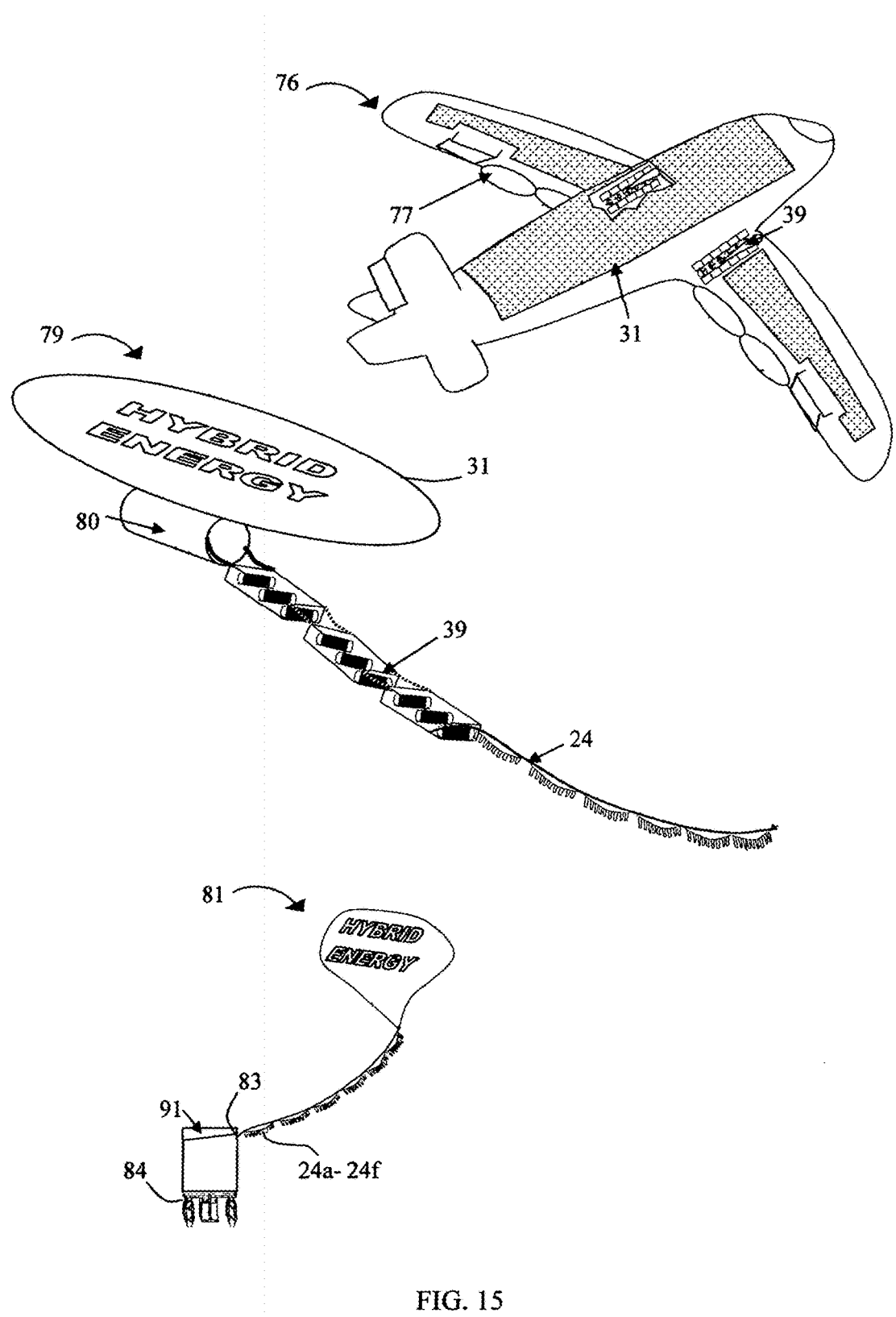
FIG. 15 shows a perspective configuration of various an airplane and inflatable's.

FIG. 15 illustrates various airplanes, blimps comprising wind turbines floating below, and as well including mounted solar panels or film, and an air balloon with a piezoelectric array is floating or hanging off the wind turbine tower.

As shown FIG. 15 discusses a plausible method for the HES method for a blimp 87 which can carry passengers or just operate as a remote controlled blimp 88 as illustrated. The blimps balloon may comprise solar film 31 (as shown in white instead of black background color).

Plausibly the wind turbine array 39 and piezoelectric devices 24 can be towed in the air to produce hybrid energy ideally for buildings, and also is commercial renewable energy source to power homes, businesses via cable line 49.

As shown in FIG. 15 discusses plausible method for also shows a an autonomous carrier 91 that is to anchors on a piezoelectric inflatable 81, and thus the tether cable with a power wire harness 83 then connects to helium tank with controller 82 can inflate the balloon 81 which is managed accordingly.

Figure 16:
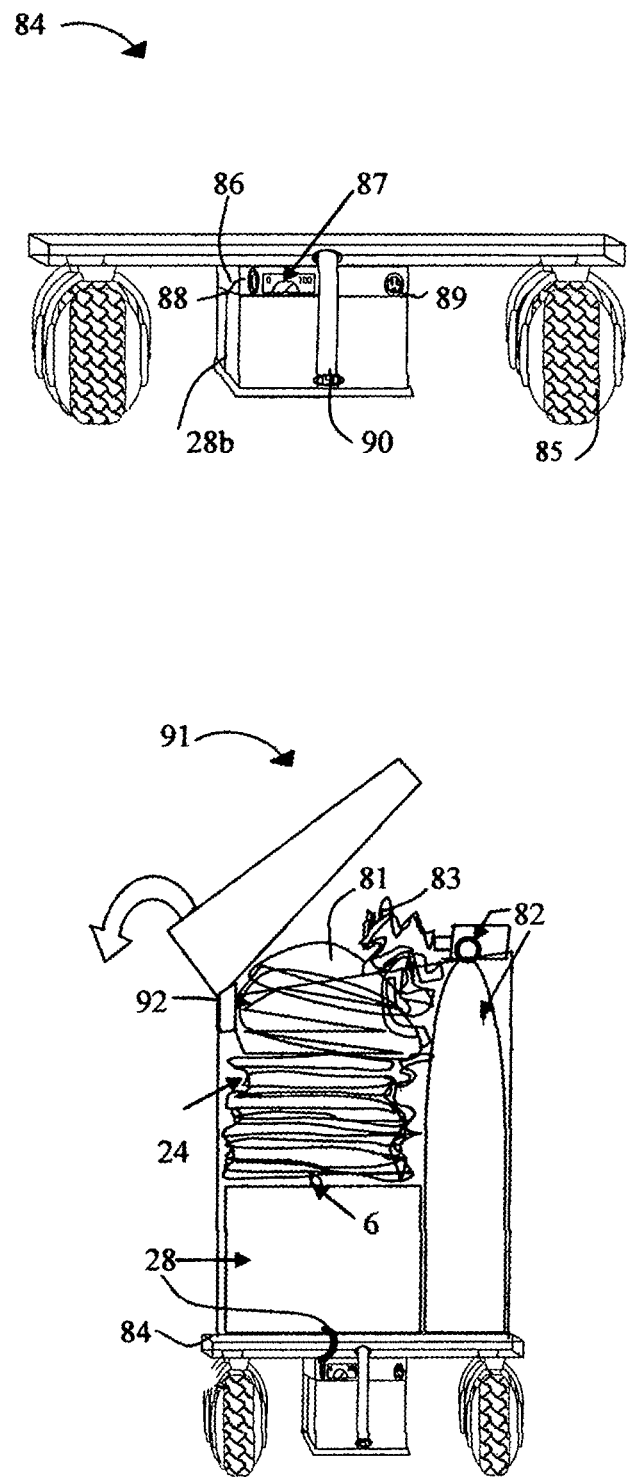
FIG. 16 shows a perspective configuration of an autonomous battery cart and inflatable method.

In FIG. 15 and in FIG. 16 the autonomous cart base 84 is comprising omniwheel motorized casters 85, and a cart controller 86 with battery charger, a gauge 87, an in source 88 and outsource power outlet 89, and a battery housing 90. An autonomous carrier 91 includes a door hatch comprising a controller 92. While parked an autonomous carrier 91 receives instructions from said controller 92 to open the door or flip door closed.

Accordingly as shown HES site FIG. 15 comprises a method for the autonomous cart controller shunts helium from tank 82 and inflates the balloon 81 it ascends up and out of the autonomous carrier compartment 91. The piezoelectric inflatable power wire harness 83 connecting piezoelectric devices 24 ascend.

In further detail FIG. 16 illustrates the autonomous cart base 84 comprises a method for the wind to activates piezoelectric devices 24 and produces energy, a controller 86 charger manages voltage and shunts voltage to autonomous cart base 84 with batteries 28. During this charging activity this autonomous carrier 91 receives instructions from said controller 82 to close the door hatch 92 via an electric motor 78 until battery if fully charged afterwards the helium tank autonomously shuts off via controller 82 and balloon 81 deflates.

Accordingly as shown HES site FIG. 16 comprises a method for the autonomous cart base 84 comprising omniwheel motorized casters 85 is instructed via controller to shut down. The balloon is gathered by a maintenance worker and thus process is repeated at other sites.

The abovementioned as specified in generic terms may not be technologically precise and most of the devices and components can be purchased on the marketplace. It is apparent to those skilled in the art that many more entailed nuances are possible within the scope of the invention.

The invention claimed is:

1. A hybrid energy system comprising:
    a first turbine array which includes one or more wind turbine blades fixed onto an axis rod which operatively cranks one or more generators, said generator is comprising a nacelle up gear and a brake controller,
    a modular frame,
    a stand which is hinged to collapse,
    a telescoping pole for supporting the first turbine array positioned in horizontal or vertical group alignment,
    at least one solar panel placed above the first turbine array,
    an autonomous cart base comprising: omniwheel motorized casters, a battery bank, GPS, satellite communication, and a controller, wherein the controller manages the charging of the battery bank,
    at least one monitoring gauge for managing the autonomous cart base via the controller, and
    at least one piezoelectric device which includes one or more flexible panels fixed onto a tether cable.

2. The hybrid energy system of claim 1 wherein the hybrid energy system is on one of: onboard, a mega vessel, a barge and a buoy.

3. The hybrid energy system of claim 1 further includes a second turbine array which includes one or more hydroelectric blades, a set of sealed generators for hydroelectric power generation.

4. The hybrid energy system of claim 1 further includes a third turbine array which includes one or more solid debris impact blades.

5. The hybrid energy system of claim 1 further includes a fourth turbine array which includes one or more hydro propelled blade.

6. The hybrid energy system of claim 1 further includes a fifth turbine array which includes one or more element forced blades, the hybrid energy system inside of one of conduit pipe, a below conduit pipeline and an above ground pipeline.

* * * * *